(12) United States Patent
Tang

(10) Patent No.: US 10,416,505 B2
(45) Date of Patent: Sep. 17, 2019

(54) PIXEL STRUCTURE AND LIQUID CRYSTAL DISPLAY DEVICE COMPRISING SAME

(71) Applicant: Shenzhen China Star Optoelectronics Technology Co., Ltd., Shenzhen, Guangdong (CN)

(72) Inventor: Yuejun Tang, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 365 days.

(21) Appl. No.: 14/435,526

(22) PCT Filed: Jan. 29, 2015

(86) PCT No.: PCT/CN2015/071817
§ 371 (c)(1),
(2) Date: Apr. 14, 2015

(87) PCT Pub. No.: WO2016/115749
PCT Pub. Date: Jul. 28, 2016

(65) Prior Publication Data
US 2016/0342045 A1    Nov. 24, 2016

(30) Foreign Application Priority Data

Jan. 20, 2015  (CN) .......................... 2015 1 0029233

(51) Int. Cl.
*G02F 1/1343*        (2006.01)
*G02F 1/1368*        (2006.01)
(Continued)

(52) U.S. Cl.
CPC ...... *G02F 1/134363* (2013.01); *G02F 1/1368* (2013.01); *G02F 1/13439* (2013.01);
(Continued)

(58) Field of Classification Search
USPC ......................................................... 349/141
See application file for complete search history.

(56) References Cited

U.S. PATENT DOCUMENTS 7,688,413 B2 *  3/2010  Ito .................... G02F 1/134363
                                                    349/141
7,924,386 B2 *  4/2011  Lee ................... G02F 1/133371
                                                    349/141
(Continued)

FOREIGN PATENT DOCUMENTS

CN           2743872 Y      11/2005
CN        101900913 A       12/2010
(Continued)

*Primary Examiner* — Edward J Glick
*Assistant Examiner* — David Y Chung
(74) *Attorney, Agent, or Firm* — Andrew C. Cheng

(57) ABSTRACT

A pixel structure is arranged on an array substrate and controlled by one or two TFTs. The pixel structure includes a plurality of raised structures, a plurality of projection electrodes, and a bottom electrode. The projection electrodes are formed on the raised structures. The bottom electrode is located under the raised structures. The projection electrodes formed on the raised structures may induce a horizontal electric field therebetween. The bottom electrode and the projection electrodes formed on the raised structures may induce a sideway horizontal electric field therebetween. A liquid crystal display device including the pixel structure is also provided. The pixel structure and the liquid crystal display device reduce a vertical electric field component and increase a horizontal electric field so as to increase transmittance of the FFS and IPS modes or the response speed of liquid crystal and reduce the trend of positive liquid crystal to stand up.

8 Claims, 7 Drawing Sheets

(51) Int. Cl.
*G02F 1/1362* (2006.01)
*G02F 1/1337* (2006.01)

(52) U.S. Cl.
CPC .. *G02F 1/133707* (2013.01); *G02F 1/136286* (2013.01); *G02F 2001/134345* (2013.01); *G02F 2001/134372* (2013.01); *G02F 2001/134381* (2013.01); *G02F 2201/121* (2013.01); *G02F 2201/122* (2013.01); *G02F 2201/123* (2013.01)

(56) References Cited

U.S. PATENT DOCUMENTS

| | | | | |
|---|---|---|---|---|
| 8,648,983 | B2* | 2/2014 | Tsai | G02F 1/1334 349/141 |
| 8,736,800 | B2* | 5/2014 | Chang | G02F 1/133371 349/141 |
| 8,767,166 | B2* | 7/2014 | Kubota | G02F 1/133707 349/139 |
| 8,780,308 | B2* | 7/2014 | Li | G02F 1/1343 349/141 |
| 8,786,811 | B2* | 7/2014 | Kubota | G02F 1/133707 349/141 |
| 8,848,156 | B2* | 9/2014 | Lee | G02F 1/134309 349/138 |
| 2007/0188690 | A1 | 8/2007 | Ochiai | |
| 2009/0153761 | A1* | 6/2009 | Park | G02F 1/134363 349/43 |
| 2010/0053490 | A1* | 3/2010 | Kang | G02F 1/133371 349/48 |
| 2012/0327346 | A1* | 12/2012 | Tsai | G02F 1/134363 349/138 |
| 2013/0044145 | A1 | 2/2013 | Li et al. | |
| 2013/0128207 | A1* | 5/2013 | Nakano | G02F 1/1343 349/141 |

FOREIGN PATENT DOCUMENTS

| | | |
|---|---|---|
| CN | 202210200 U | 5/2012 |
| CN | 102841472 A | 12/2012 |
| CN | 102854672 A | 1/2013 |
| CN | 103018976 A | 4/2013 |
| CN | 103869557 A | 6/2014 |
| CN | 103959158 A | 7/2014 |

* cited by examiner

PIXEL STRUCTURE AND LIQUID CRYSTAL DISPLAY DEVICE COMPRISING SAME

CROSS REFERENCE TO RELATED APPLICATIONS

This application claims the priority of Chinese Patent Application No. 201510029233.9, entitled "Pixel Structure and Liquid Crystal Display Device Comprising Same", filed on Jan. 20, 2015, the disclosure of which is incorporated herein by reference in its entirety.

BACKGROUND OF THE INVENTION

1. Field of the Invention

The present invention relates to the field of liquid crystal displaying, and in particular to a pixel structure and a liquid crystal display device comprising the pixel structure.

2. The Related Arts

With the continuous development of the liquid crystal display technology, liquid crystal display devices, such as light emitting diode panels, have been widely used as a displaying component in electronic products, such as mobile phones, digital cameras, and personal digital assistants (PDAs). The liquid crystal display device generally comprises two light-transmitting substrates, which include an upper substrate and a lower substrate. The lower substrate comprises an electrode array formed thereon, including gate lines and data lines perpendicular to the gate lines. A thin-film transistor (TFT) device is set at each intersection between the gate lines and the data lines in order to transmit a signal from the gate lines to a pixel electrode. The lower substrate has a pixel zone that comprises a common electrode and a pixel electrode. The common electrode and the pixel electrode are on the same surface. Liquid crystal is filled between the upper substrate and the lower substrate and is movable in the pixel electrode zone with the effect of an electric field.

Most of the liquid crystal display devices suffer problems of slow response speed and small viewable angle. To overcome the problems of narrow view angles of the twisted nematic mode, IPS (In-Plane Switching) mode liquid crystal display devices and FFS (Fringe Field Switching) mode liquid crystal display devices are commonly used, both sharing an advantage of wide view angle. However, a liquid crystal display device of the IPS mode or the FFS mode, when generating a horizontal electric field, also generates an electric field component in a vertical direction. The greater the potential difference between the pixel electrode and the common electrode is, the greater the electric field component in the vertical direction will be. This severely reduces transmittance or response time of the IPS mode and the FFS mode, making them not suiting the needs of the users.

SUMMARY OF THE INVENTION

The present invention provides a pixel structure and a liquid crystal display device comprising the pixel structure, which can reduce an electric field component in a vertical direction and also increases the electric field in a horizontal direction so as to increase transmittance or response time of the IPS mode or FFS mode to suit the needs of users.

On the one hand, the present invention provides a pixel structure, which is arranged on an array substrate and controllable by one or two thin-film transistors, wherein the pixel structure comprises a plurality of raised structures, a plurality of projection electrodes, and a bottom electrode, the projection electrodes being formed on the raised structures, the bottom electrode being arranged under the raised structures, the projection electrodes formed on the raised structures inducing a horizontal electric field therebetween, the bottom electrode and the projection electrodes formed on the raised structures inducing therebetween a sideway horizontal electric field.

In the above pixel structure, each of the pixel structures is controlled by two thin-film transistor devices and each of the projection electrodes comprises a first pixel electrode and a second pixel electrode, the first pixel electrode and the second pixel electrode being provided with voltages having a polarity opposite to a voltage polarity of the bottom electrode, the first pixel electrode and the second pixel electrode being respectively formed on different ones of the raised structures to form corresponding projection electrodes, or alternatively, the first pixel electrode and the second pixel electrode being formed on the same one of the raised structures and the first pixel electrode and the second pixel electrode being spaced from each other by a predetermined distance.

In the above pixel structure, each of the projection electrodes comprises a pixel electrode and/or a common electrode, the pixel electrode being set at a location corresponding to a location of the raised structure, the pixel electrode being formed on an outside surface of the raised structure, the common electrode being set at a location corresponding to the location of the raised structure, the common electrode being formed on the outside surface of the raised structure.

In the above pixel structure, the pixel electrode and the common electrode and the raised structure are both made of a conductive material of indium tin oxide or IXO series, the pixel electrode being entirely formed on the raised structure to form a projection electrode, the common electrode being entirely formed on the same raised structure to form a projection electrode.

In the above pixel structure, the raised structure is made of one of a resin polymer, overcoat, and SiNx series and the pixel electrode and the common electrode are made of a conductive material of indium tin oxide or IXO series, the pixel electrode and the common electrode being both formed on the outer surface of the same raised structure, the pixel electrode and the common electrode being spaced from each other by a predetermined distance.

In the above pixel structure, the pixel electrode and the common electrode are both formed on the outside surface of the same raised structure, the pixel electrode and the common electrode being spaced from each other by a predetermined distance, the common electrode being electrically connected to the common electrode located under the raised structure, or alternatively, the pixel electrode and the common electrode are both formed on the outside surface of the raised structures, the pixel electrode and the common electrode being spaced from each other by a predetermined distance, the pixel electrode being electrically connected to the pixel electrode located under the raised structure.

In the above pixel structure, the raised structures are each in the form of a circular stand having a trapezoidal cross section, the raised structures having a bottom located on the array substrate, or alternatively, the raised structures are each, in the entirety thereof, in the form of a straight triangular prism having a cross section of an isosceles triangle, a side of the raised structure being located on the array substrate.

In the above pixel structure, the raised structures have a shape in the form of one of a circular stand, a straight triangular prism having a cross section of an isosceles triangle, a semi-ellipse, a semicircle, and a parallelogram.

In the above pixel structure, the raised structures have a height larger than or equal to 1 micrometer and smaller than or equal to 5 micrometers and the raised structures have an inclination angle larger than or equal to 15 degrees and smaller than or equal to 80 degrees.

On the other hand, the present invention provides a liquid crystal display device, which comprises an array substrate and a color filter, the color filter being arranged at one side of the array substrate and in alignment with the array substrate, wherein the liquid crystal display device further comprises a pixel structure located between the array substrate and the color filter substrate, the pixel structure being formed on the array substrate and controllable by one or two thin-film transistor devices, wherein the pixel structure comprises a plurality of raised structures, a plurality of projection electrodes, and a bottom electrode, the projection electrodes being formed on the raised structures, the bottom electrode being located under the raised structures, the projection electrodes formed on the raised structures inducing a horizontal electric field therebetween, the bottom electrode and the projection electrodes formed on the raised structures inducing therebetween a sideway horizontal electric field.

In the above liquid crystal display device, each of the pixel structures is controlled by two thin-film transistor devices and each of the projection electrodes comprises a first pixel electrode and a second pixel electrode, the first pixel electrode and the second pixel electrode being provided with voltages having a polarity opposite to a voltage polarity of the bottom electrode, the first pixel electrode and the second pixel electrode being respectively formed on different ones of the raised structures to form corresponding projection electrodes, or alternatively, the first pixel electrode and the second pixel electrode being formed on the same one of the raised structures and the first pixel electrode and the second pixel electrode being spaced from each other by a predetermined distance.

In the above liquid crystal display device, each of the projection electrodes comprises a pixel electrode and/or a common electrode, the pixel electrode being set at a location corresponding to a location of the raised structure, the pixel electrode being formed on an outside surface of the raised structure, the common electrode being set at a location corresponding to the location of the raised structure, the common electrode being formed on the outside surface of the raised structure.

In the above liquid crystal display device, the pixel electrode and the common electrode and the raised structure are both made of a conductive material of indium tin oxide or IXO series, the pixel electrode being entirely formed on the raised structure to form a projection electrode, the common electrode being entirely formed on the same raised structure to form a projection electrode.

In the above liquid crystal display device, the raised structure is made of one of a resin polymer, overcoat, and SiNx series and the pixel electrode and the common electrode are made of a conductive material of indium tin oxide or IXO series, the pixel electrode and the common electrode being both formed on the outer surface of the same raised structure, the pixel electrode and the common electrode being spaced from each other by a predetermined distance.

In the above liquid crystal display device, the pixel electrode and the common electrode are both formed on the outside surface of the same raised structure, the pixel electrode and the common electrode being spaced from each other by a predetermined distance, the common electrode being electrically connected to the common electrode located under the raised structure, or alternatively, the pixel electrode and the common electrode are both formed on the outside surface of the raised structures, the pixel electrode and the common electrode being spaced from each other by a predetermined distance, the pixel electrode being electrically connected to the pixel electrode located under the raised structure.

In the above liquid crystal display device, the raised structures are each in the form of a circular stand having a trapezoidal cross section, the raised structures having a bottom located on the array substrate, or alternatively, the raised structures are each, in the entirety thereof, in the form of a straight triangular prism having a cross section of an isosceles triangle, a side of the raised structure being located on the array substrate.

In the above liquid crystal display device, the raised structures have a shape in the form of one of a circular stand, a straight triangular prism having a cross section of an isosceles triangle, a semi-ellipse, a semicircle, and a parallelogram.

In the above liquid crystal display device, the raised structures have a height larger than or equal to 1 micrometer and smaller than or equal to 5 micrometers and the raised structures have an inclination angle larger than or equal to 15 degrees and smaller than or equal to 80 degrees.

Compared to the prior art, in the pixel structure and the liquid crystal display device according to the embodiments of the present invention, it can be seen from the arrangement of the projection electrodes including the pixel electrode and the common electrode and the raised structures that since the pixel electrode and the common electrode are respectively formed on corresponding ones of the raised structures and a bottom electrode is arranged under the raised structures, such a design and arrangement help reduce the surface areas of the pixel electrodes and the common electrode in the horizontal direction and increase the surface areas in the inclined direction or vertical direction and further, by providing different definitions to the signals of the projection electrodes formed on the raised structures and the bottom electrode, the electrodes on the raised structures may present therebetween a horizontal electric fields for the IPS/FIS mode and the projection electrodes on the raised structures and the bottom electrode may present therebetween a sideway horizontal electric field for an FFS mode, thereby achieving the purposes of reducing the vertical electric field component and increasing the horizontal electric field and thus increasing the transmittance of the FFS and IPS modes or the response speed of liquid crystal and reducing the trend for positive liquid crystal to stand up.

BRIEF DESCRIPTION OF THE DRAWINGS

To more clearly explain the technical solution proposed in an embodiment of the present invention and that of the prior art, brief descriptions of the drawings that are necessary for describing the embodiment or the prior art are given as follows. It is obvious that the drawings that will be described below show only some embodiments of the present invention. For those having ordinary skills of the art, other drawings may also be readily available from these attached drawings without the expense of creative effort and endeavor.

DETAILED DESCRIPTION OF THE PREFERRED EMBODIMENTS

Figure 1:
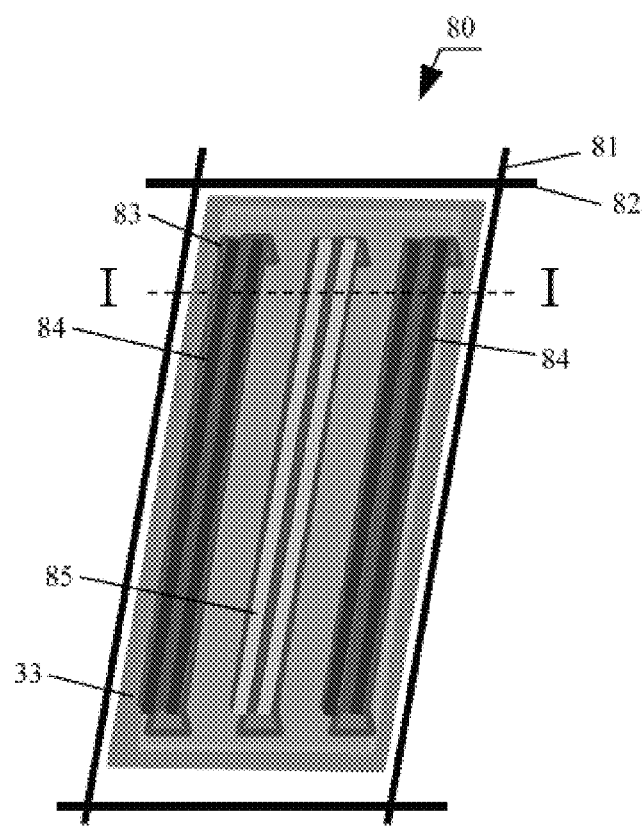
FIG. 1 is a schematic view showing a pixel structure of a liquid crystal display device according to the present invention.

A clear and complete description will be given to technical solutions of embodiments of the present invention with reference to the attached drawings of the embodiments of the present invention. However, the embodiments so described are only some, but not all, of the embodiments of the present invention. Other embodiments that are available to those having ordinary skills of the art without the expense of creative effort and endeavor are considered belonging to the scope of protection of the present invention.

Further, the following descriptions of the various embodiments are made with reference to the attached drawings for illustrating, in an exemplary way, specific embodiments to which the present invention is applicable. Directional terminology, such as "up", "down", "front", "rear", "left", "right", "internal", "external", and "side", used in the present invention are described according to the direction shown in the drawings and are not intended to indicate or suggest a designated device or element must be of a specific direction or be constructed or operated in a specific direction and thus they should not be construed as constraint to the scope of the present invention.

In the description of the present invention, it is noted that unless explicitly specified or constrained, the terms "mounting", "interconnecting", and "connecting" should be interpreted as fixed connection and may alternatively be releasable connection or integral connection; or being mechanically connected; or in direction connection with each other or interconnected through an intermediate medium; or being communication between interiors of two elements. For those having ordinary skills in the art can appreciate the meaning of these terms as used in the present invention in specific conditions.

Further, unless specified otherwise, in the description of the present invention, "plural" means two or more than two. The term "operation", when appearing in the specification, does not just include an independent operation and may also include a desired effect of the operation achieved with the operation when the operation is not distinguishable from other operations. The symbol "~" used in the present invention to define a numeric range, of which the minimum and maximum are respectively corresponding to the figures set in front of and behind of the symbol "~". In the attached drawings, similar structures or identical units are designated with the same reference numerals.

Figure 2:
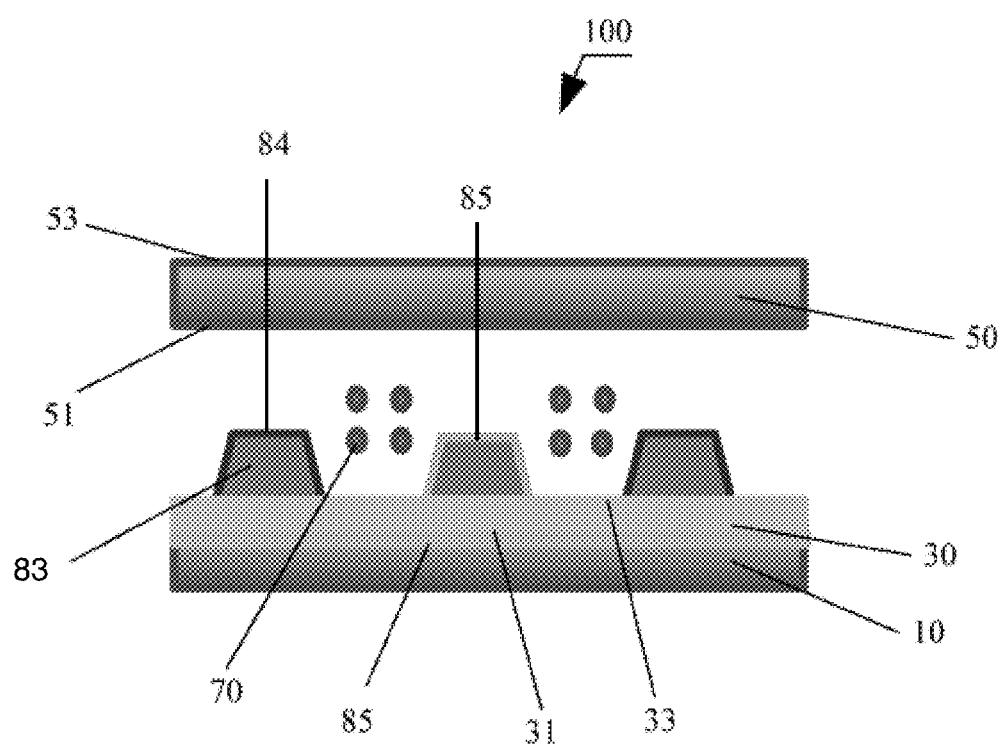
FIG. 2 is a schematic cross-sectional view taken along line I-I of the liquid crystal display device according to an embodiment of the present invention.

Referring to FIGS. 1 and 2, FIG. 1 is a schematic view showing a pixel structure of a liquid crystal display device according to the present invention and FIG. 2 is a schematic cross-sectional view taken along line I-I of the liquid crystal display device according to an embodiment of the present invention. As shown in FIGS. 1 and 2, the liquid crystal display device 100 comprises a backlight module 10, an array substrate 30, a CF (color filter) substrate 50, and liquid crystal 70 located between the array substrate 30 and the CF substrate 50 and a plurality of pixel structures 80. In an embodiment of the present invention, the liquid crystal display device 100 and the pixel structures 80 are applicable to any product or component that has a displaying function, such as an electronic paper, a liquid crystal television, a mobile phone, a digital picture frame, and a tablet compute.

In an embodiment of the present invention, the backlight module 10 is one of the key components of a touch panel 100 for supplying a light source that has sufficient brightness and is uniformly distributed in order to allow the touch panel 100 to normally display an image. The array substrate 30 is a TFT (thin film transistor) array substrate, which is positioned above the backlight module 10. The array substrate 30 generates an electric field that controls movement of the liquid crystal 70. In an embodiment of the present invention, the array substrate 30 comprises a first surface 31 and a second surface 33 substantially parallel to the first surface 31. The first surface 31 is aligned with and positioned tightly against the backlight module 10.

The CF substrate 50 is set in alignment with a surface of the array substrate 30 that is opposite to the backlight module 10 (namely the second surface 33 of the array substrate 20). The CF substrate 50 is an optic filter for displaying of color and may reflect off optic waves of undesired range of wavelength by selecting optical waves of a pre-passing range of wavelength through accurate selection. In an embodiment of the present invention, the CF substrate 50 comprises a first surface 51 and a second surface 53 substantially parallel to the first surface 51. The first surface 51 is a front surface of the CF substrate 50 that faces exactly the second surface 33 of the array substrate 30. The second surface 53 is a rear surface of the CF substrate 30.

The liquid crystal 70 is located between the array substrate 30 and the CF substrate 50 and, specifically, the liquid crystal is interposed between the second surface 33 of the array substrate 30 and the first surface 51 of the CF substrate 50. The liquid crystal 70 is movable between the array substrate 30 and the CF substrate 50 with an effect of an electric field applied thereto so that light emitting from the backlight module 10 is allowed to transmit through the liquid crystal layer to irradiate the CF substrate 50.

The plurality of pixel structures 80 is arranged on the second surface 33 of the array substrate 30, as shown in FIG. 2. In an embodiment of the present invention, each of the pixel structures 80 comprises two data lines 81, two gate lines 82, raised structures 83, pixel electrodes 84, and a common electrode 85 and each of the pixel structures 80 is controlled by a TFT (thin film transistor) device (not shown).

In an embodiment of the present invention, the two data lines 81 are formed on the second surface 33 of the array substrate 30 and the two are spaced from each other by a predetermined distance (where the direction of the data lines 81 is defined as a horizontal direction). The two gate lines 82 are formed on the second surface 33 of the array substrate 30 and the two are spaced from each other by a predetermined distance (where the direction of the gate lines 82 is defined as a horizontal direction) and perpendicular to the data lines 81. The data lines 81 and the gate lines 82 intersect perpendicularly so as to form an electrode array and a TFT device is set at an intersection of the two. The TFT device transmits a signal from the gate lines 82 to the pixel electrodes 84. Specifically, the data lines 81 transmit a greyscale signal and the gate lines 82 transmit a scan signal.

The raised structures 83 are arranged on the second surface 33 of the array substrate 30. In an embodiment of the present invention, the raised structures 83 are each, in the entirety thereof, in the form of a circular stand having a trapezoidal cross section. The raised structures 83 have a bottom located on the second surface 33 of the array substrate 30. The raised structures 83 are made of a transparent insulation material and, specifically, the raised structures 83 are made of resin polymers including aromatic polymers and aliphatic, overcoat (OC), which is a photosensitive resin film, and SiNx materials. Preferably, the raised structures 83 have a height of 1-5 micrometers (μm) (namely being greater than or equal to 1 micrometer and smaller than or equal to 5 micrometers). The raised structures 83 have inclination angles α (which are the base angles of the trapezoidal cross section of the circular stand like raised structures 83) that is 15-80 degrees (namely being larger than or equal to 15 degrees and smaller than or equal to 80 degrees).

Figure 3:
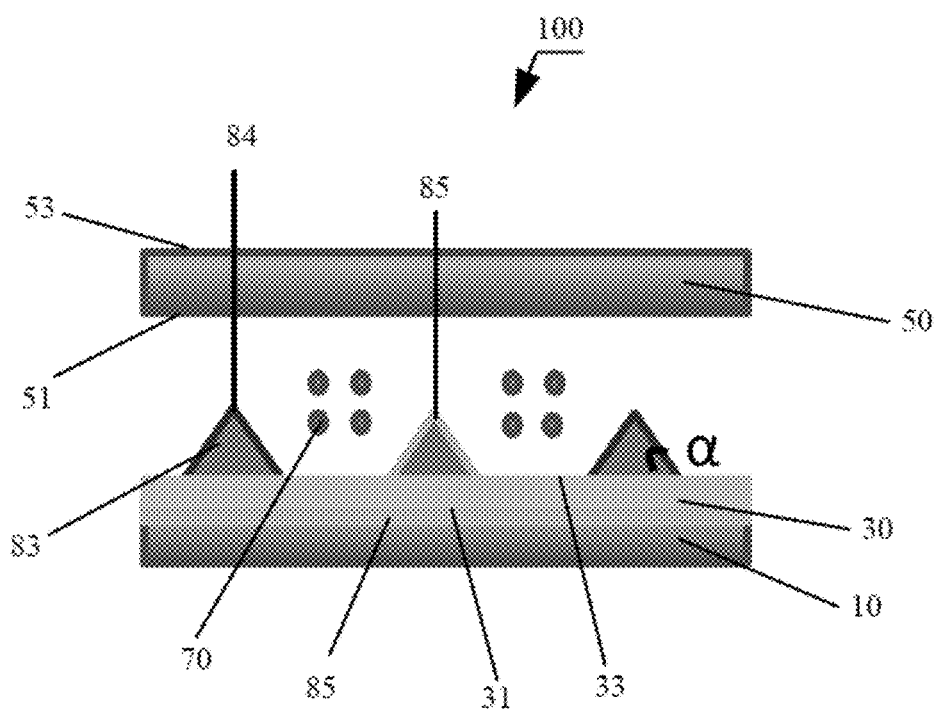
FIG. 3 is a schematic view showing another shape of a raised structure of the pixel structure of the present invention.

It can be appreciated that the shape of the raised structures 83 is not limited to a circular stand. In other embodiments of the present invention, the raised structures 83 may comprise other shapes. Referring to FIG. 3, FIG. 3 is a schematic view showing another shape of the raised structures of the pixel structures of the present invention. As shown in FIG. 3, the raised structures 83, in the entirety thereof, are each in the form of a triangular prism and, preferably, the shape of the raised structures 83 is a straight triangular prism of which the cross section is an isosceles triangle with a side of the raised structures 83 located on the second surface 33 of the array substrate 30. Further, the raised structures 83 can be of a shape of semi-ellipse, semicircle, or parallelogram.

Preferably, the raised structures 83 have a height of 1-5 micrometers (μm). The raised structures 83 have inclination angles α (which are the internal angles of the regular triangle of the circular stand like raised structures 83) that is 15-80 degrees.

In an embodiment of the present invention, the pixel electrodes 84 are set at locations corresponding to the raised structures 83 and the pixel electrodes 84 are formed on outside surfaces of the raised structures 83. The pixel electrodes 84 function to drive the pixel according to the greyscale signal. Preferably, the pixel electrodes 84 are made of a conductive material having excellent transparency and, preferably, the pixel electrodes 84 comprise conductive materials of ITO (Indium tin oxide) or IXO materials and can be formed through processes such as sputtering and chemical vapor deposition. Thus, the pixel electrodes 84 and the raised structures 83 are made of different materials and each pixel electrode 84 is entirely formed on the same raised structure 83 to form a projection electrode. It can be appreciated that the raised structures 83 may be made of the same material as that of the pixel electrodes 84, namely the raised structures 83 can be made of conductive materials of ITO or IXO materials, and under this condition, the raised structure 83 and the projection electrode are integrated as a unity.

In an embodiment of the present invention, the common electrode 85 is set at a location corresponding to the raised structure 83 and the common electrode 85 is formed on an outside surface of the raised structures 83. The common electrode 85 functions to supply a common electrode voltage to the pixels. Preferably, the common electrode 85 is made of a conductive material having excellent transparency and, preferably, the common electrode 85 comprises a conductive material of ITO or IXO materials and can be formed through processes such as sputtering and chemical vapor deposition. Thus, the common electrode 85 and the raised structure 83 are made of different materials and the common electrode 85 is entirely formed on the same raised structure 83 to form a projection electrode. It can be appreciated that the raised structure 83 may be made of the same material as that of the common electrode 85, namely the raised structure 83 can be made of conductive materials of ITO or IXO materials, and under this condition, the raised structure 83 and the projection electrode are integrated as a unity.

Figure 4:
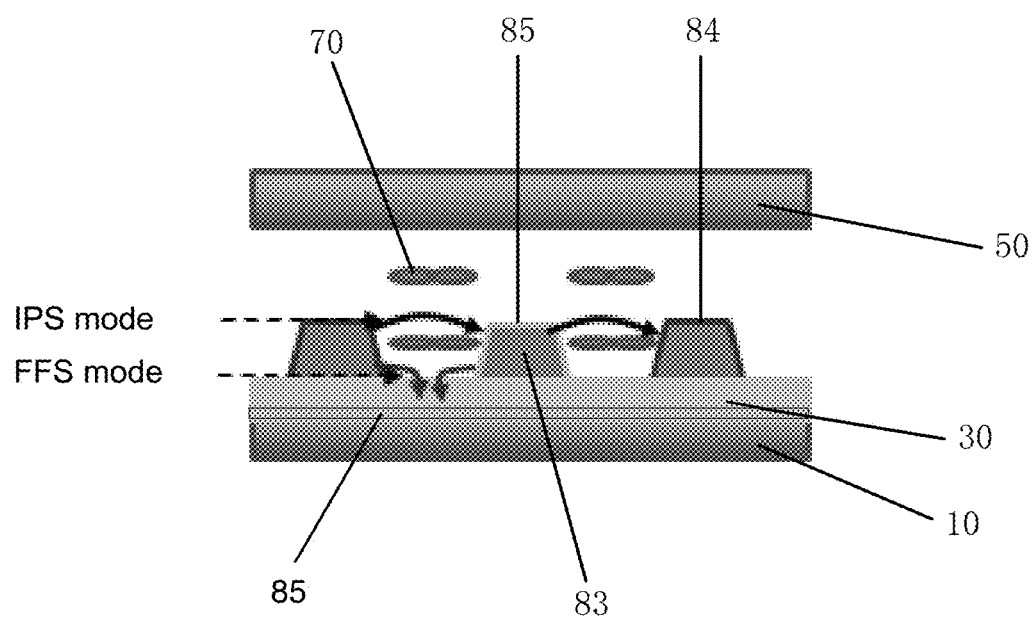
FIG. 4 is a schematic view showing IPS displaying generated between projection electrodes of the raised structure of the liquid crystal display device and FFS displaying generated between the projection electrode and a bottom electrode according to the present invention.

Referring to FIG. 4, FIG. 4 is a schematic view showing IPS displaying generated between projection electrodes of the raised structures of the liquid crystal display device and FFS displaying generated between the projection electrodes and bottom electrodes according to the present invention. Based on the arrangement of the pixel electrodes 84, the common electrode 85, and the raised structures 83, it can be seen that the pixel electrodes 84 and the common electrode 85 are respectively formed on the raised structures 83 and a bottom electrode is arranged under the raised structures 83 and in the present invention, the bottom electrode can be set as the common electrode 85. Based on such an arrangement, the surface areas of the pixel electrodes 84 and the common electrode 85 in a horizontal direction can be reduced and the surface areas in an inclined direction or a vertical direction can be increase and further, by providing different definitions to the signals of the pixel electrodes 54 and the common electrode 85 formed on the raised structures 83 and the bottom electrode, the electrodes on the raised structures 83 may present therebetween a horizontal electric field for an IPS and the electrodes on the raised structures 83 and the bottom electrode may present therebetween a sideways horizontal electric field for an FFS mode, thereby achieving the purposes of reducing the vertical electric field component and increasing the horizontal electric field and thus increasing the transmittance or response time of the FFS and IPS modes.

Figure 5:
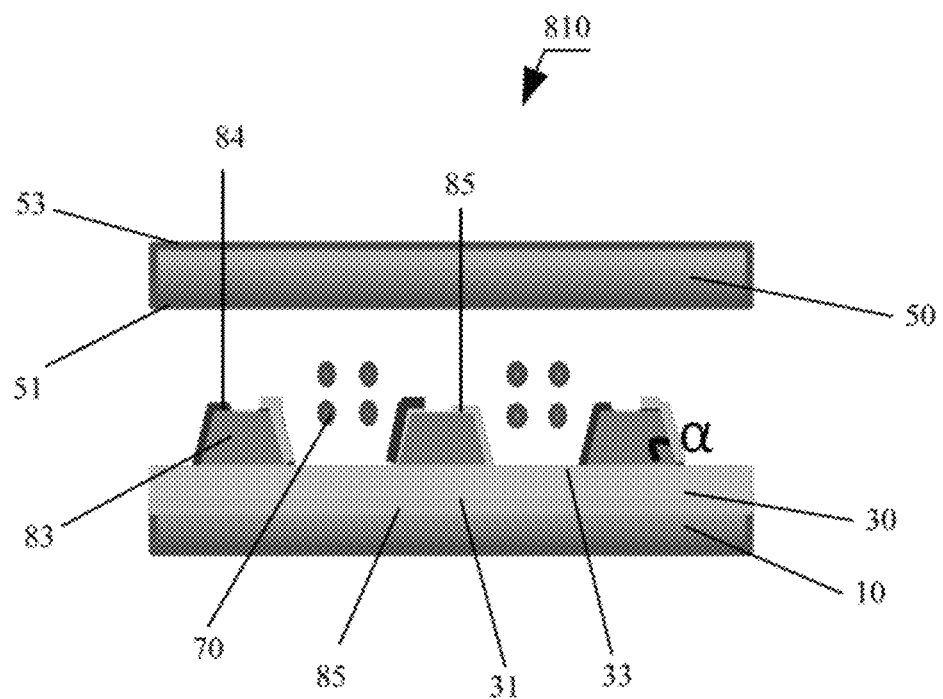
FIG. 5 is a schematic view showing another pixel structure of a liquid crystal display device according to the present invention.

Referring to FIG. 5, FIG. 5 is a schematic view showing another pixel structure of a liquid crystal display device according to the present invention. As shown in FIG. 5, for convenience of illustration and description, in an embodiment of the present invention, the structure of a pixel structures 810 of the instant embodiment is similar to the structure of the pixel structures 80 shown in FIGS. 1-4. The pixel structures 810 of the instant embodiment comprises two data lines 81, two gate lines 82, raised structures 83, pixel electrodes 84, and a common electrode 85. Each of the pixel structures 80 is controlled by a TFT device (not shown). The instant embodiment is described by taking circular stand like raised structures 83 as an example but is not limited to the circular stand and can be for example a straight triangular prism having a cross section of an isosceles triangle.

The pixel structure 810 of the instant embodiment is different from the pixel structure 100 of FIGS. 1-4 in that projection electrodes of different type may be formed on the same raised structures 83 and the projection electrodes of the different types are spaced from each other by a predetermined distance. In other words, a pixel electrode 84 and a common electrode 85 are both formed on the outside surface of the same one of the raised structures 83 and the pixel electrodes 84 and the common electrode 85 are spaced from each other by a predetermined distance. The raised structure 83 is made of a material different from those of the pixel electrode 84 and the common electrode 85.

Figure 6:
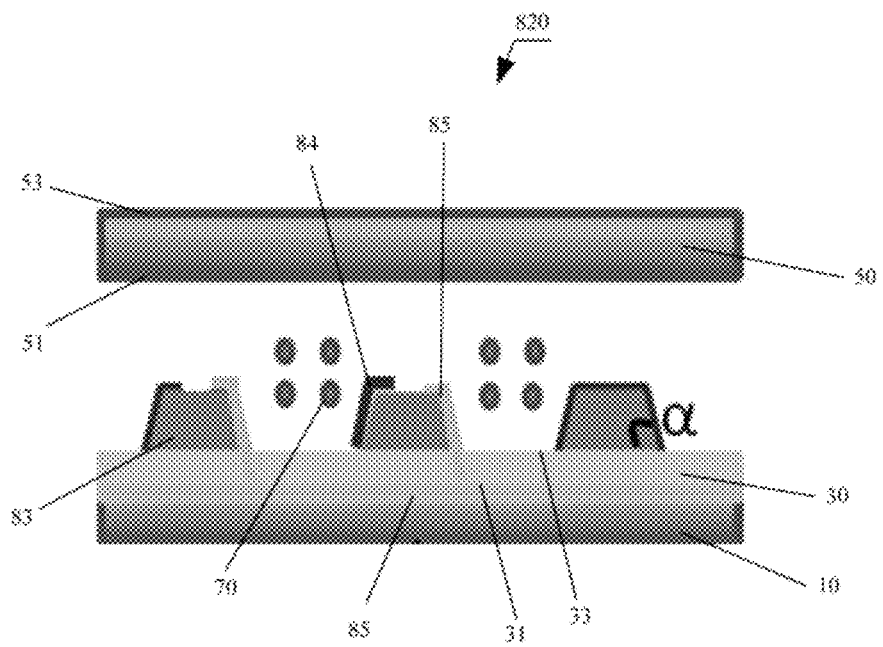
FIG. 6 is a schematic view showing a further pixel structure of a liquid crystal display device according to the present invention.

Referring to FIG. 6, FIG. 6 is a schematic view showing a further pixel structure of a liquid crystal display device according to the present invention. As shown in FIG. 6, for convenience of illustration and description, in an embodiment of the present invention, the structure of a pixel structure 820 of the instant embodiment is similar to the structure of the pixel structures 80 and 810 of FIGS. 1-5. The pixel structures 820 of the present invention comprises two data lines 81, two gate lines 82, raised structures 83, pixel electrodes 84, and a common electrode 85, Each of the pixel structures 80 is controlled by a TFT device (not shown). The instant embodiment is described by taking circular stand like raised structures 83 as an example but is not limited to the circular stand and can be for example a straight triangular prism having a cross section of an isosceles triangle.

The pixel structure 820 of the instant embodiment is different from the pixel structures 80 and 810 of FIGS. 1-5 in that projection electrodes of different type may be formed on the same raised structures 83 and the projection electrodes of the different types are spaced from each other by a predetermined distance. In other words, a pixel electrode 84 and a common electrode 85 are both formed on the outside surface of the same one of the raised structures 83 and the pixel electrodes 84 and the common electrode 85 are spaced from each other by a predetermined distance. The common electrode 85 is electrically connected to the bottom electrode (the common electrode 85 under the raised structures 83 shown in FIG. 6). The raised structure 83 is made of a material different from those of the pixel electrode 84 and the common electrode 85.

Figure 7:
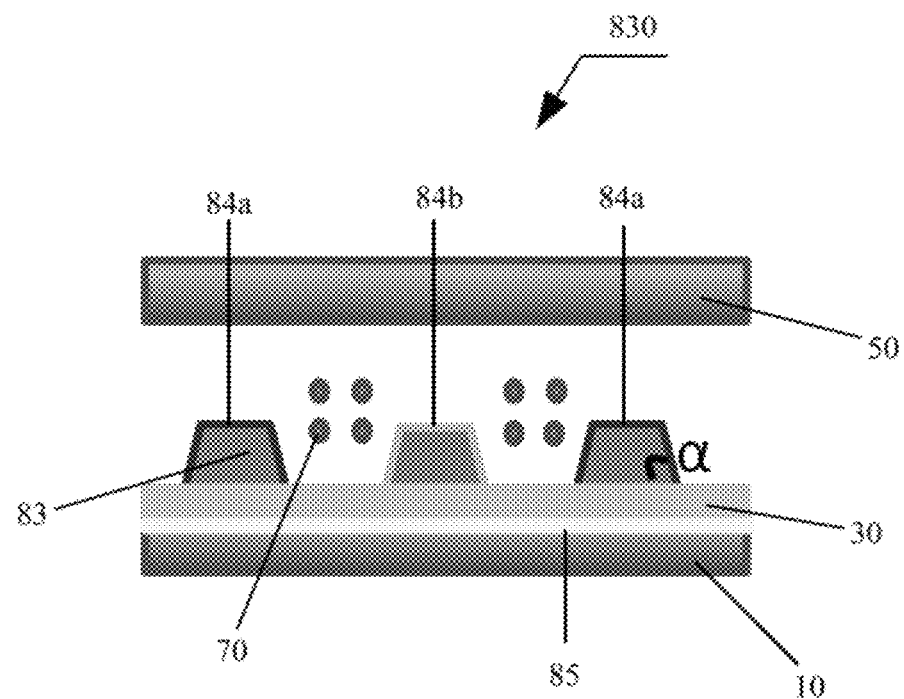
FIG. 7 is a schematic view showing a pixel structure of a liquid crystal display device according to another embodiment of the present invention.
Figure 8:
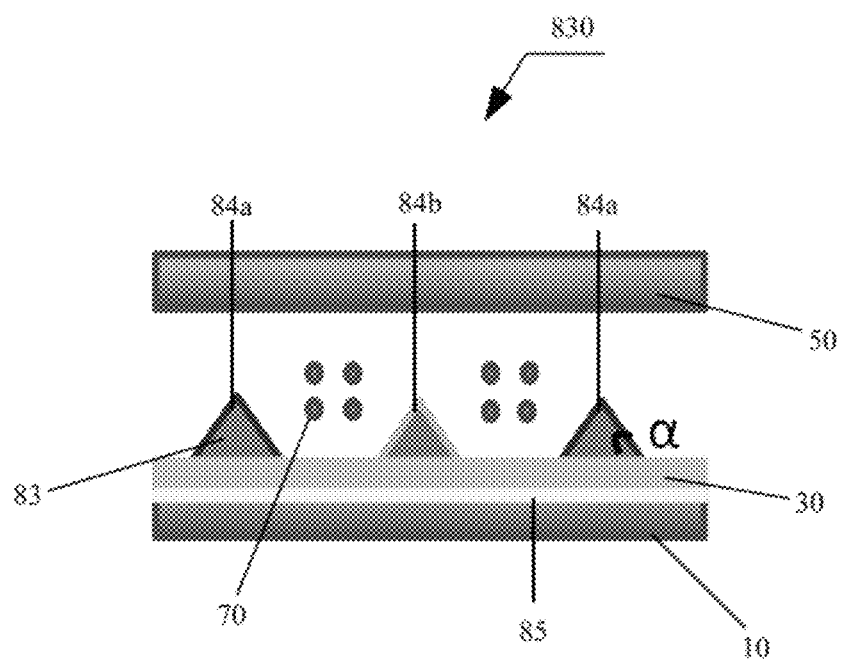
FIG. 8 is a schematic view showing another shape of a raised structure of the pixel structure shown in FIG. 7.

Referring to FIGS. 7 and 8, FIG. 7 is a schematic view showing a pixel structure of a liquid crystal display device according to another embodiment of the present invention and FIG. 8 is a schematic view showing another shape of a raised structure of the pixel structure shown in FIG. 7. As shown in FIGS. 7 and 8, for convenience of illustration and description, in an embodiment of the present invention, the structure of a pixel structure 830 of the instant embodiment is similar to the structure of the pixel structures 80, 810, and 820 of FIGS. 1-6. The pixel structure 830 of the instant embodiment comprises two data lines 81, two gate lines 82, raised structures 83, first pixel electrodes 84a, a second pixel electrode 84b, and a common electrode 85. The pixel structure 830 of the instant embodiment is different from the pixel structures 80, 810, and 820 shown in FIGS. 1-6 in that each of the pixel structures 80 is controlled by two TFT devices (not shown). The first pixel electrodes 84a and the second pixel electrode 84b are loaded or provided with voltages of a polarity opposite to that of the voltage applied to the common electrode 85 and the two are respectively formed on different ones of the raised structures 83 to form the projection electrodes. In other words, the first pixel electrodes 84a are formed on predetermined ones of the raised structures 83, while the second pixel electrode 84b is formed in another one of the raised structures 83. The instant embodiment is described by taking circular stand like raised structures 83 as an example but is not limited to the circular stand and can be for example a straight triangular prism having a cross section of an isosceles triangle.

Figure 9:
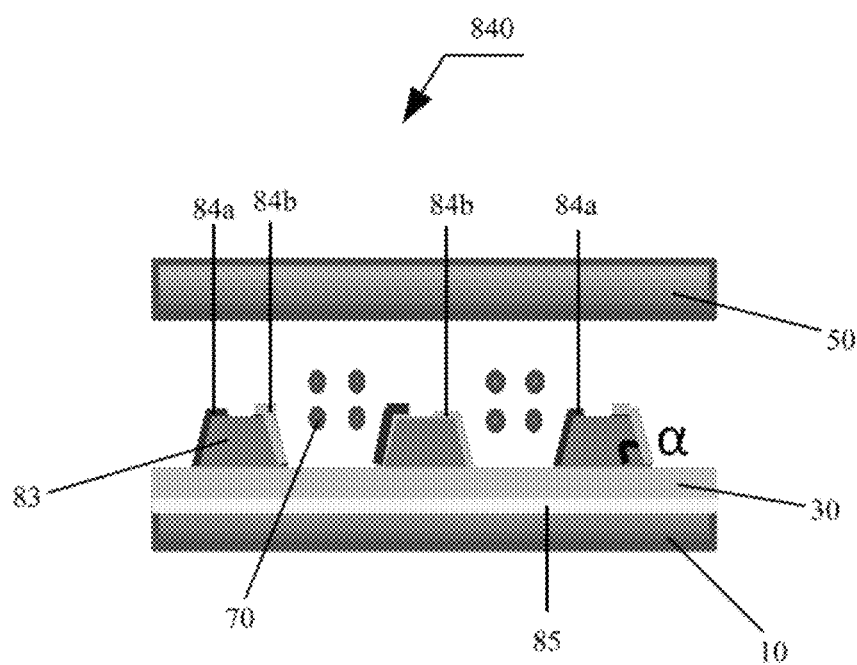
FIG. 9 is a schematic view showing another pixel structure of the liquid crystal display device shown in FIG. 7.

Referring to FIG. 9, FIG. 9 is a schematic view showing another pixel structure of the liquid crystal display device shown in FIG. 7. FIG. 9 shows a pixel structure 840 of which the structure is similar to the structure of the pixel structure 830 shown in FIGS. 7 and 8 and a difference therebetween is that two pixel electrodes of opposite polarities are both formed on the same raised structure 83 in order to form the projection electrode and the pixel electrodes having opposite polarities are spaced from each other by a predetermined distance. In other words, a first pixel electrode 84a and a second pixel electrode 84b are formed on the same raised structure 83 and the first pixel electrode 84a and the second pixel electrode 84b are spaced from each other by a predetermined distance.

The arrangements of the raised structures 83 and the projection electrodes (namely the pixel electrode 84 and/or the common electrode 85) formed on the raised structures 83 of the various embodiment described, illustrated, and depicted in FIGS. 1-6, if suitable, are all applicable to the pixel structures 830 and 840 shown in FIGS. 7-9. In the pixel electrodes 830 and 840 of the above-described embodiments, since the first pixel electrodes 84a and the second pixel electrode 84b are loaded or provided with voltage of a polarity opposite to the voltage polarity of the common electrode 85, when the first pixel electrodes 84a and the second pixel electrode 84b are formed on the same raised structure 83 or different raised structures 83, an FIS mode electric field is generated between the raised structures 83 and an FFS mode electric field is generated between the raised structures 83 and the bottom electrode (namely the common electrode 85) so that the purposes of reduced vertical electric field component and increasing horizontal electric field can be achieved.

It can be appreciated that in the embodiments of the present invention described above, the locations and definitions of the pixel electrodes 84 and the common electrode 85 can be exchanged with each other.

In summary, in the pixel structure and the liquid crystal display device according to the embodiments of the present invention, it can be seen from the arrangement of the projection electrodes including the pixel electrode 84 and the common electrode 85 and the raised structures 83 that since the pixel electrode 84 and the common electrode 85 are respectively formed on corresponding ones of the raised structures 83 and a bottom electrode is arranged under the raised structures 83, such a design and arrangement help reduce the surface areas of the pixel electrodes 84 and the common electrode 85 in the horizontal direction and increase the surface areas in the inclined direction or vertical direction and further, by providing different definitions to the signals of the projection electrodes formed on the raised structures 83 and the bottom electrode, the electrodes on the raised structures 83 may present therebetween a horizontal electric fields for the IPS/FIS mode and the projection electrodes on the raised structures 83 and the bottom electrode may present therebetween a sideway horizontal electric field for an FFS mode, thereby achieving the purposes of reducing the vertical electric field component and increasing the horizontal electric field and thus increasing the transmittance of the FFS and IPS modes or the response speed of liquid crystal and reducing the trend for positive liquid crystal to stand up.

In the description of the disclosure, the terms "an embodiment", "some embodiments", "example", "specific examples", or "some examples" are used to identify specific features, structures, materials, or characteristics described with the embodiment or example included in at least one embodiment or example of the present invention. In the disclosure, the use of the above terms does not mean the same embodiment or example. Further, the description of the specific features, structures, materials, or characteristics can be applied, in any suitable form, to one or multiple embodiments or examples.

The embodiments illustrated above are not construed as limiting the scope of protection of the technical solutions. Modifications, equivalent substitutions, and improvements that are made without departing from the spirits and principles of the above-described embodiments are considered within the scope of protection of the technical solutions.

What is claimed is:

1. A pixel structure, which is arranged on an array substrate and controllable by one or two thin-film transistors, wherein the pixel structure comprises a plurality of raised structures, a plurality of projection electrodes, and a single bottom electrode, the projection electrodes being formed on the raised structures, the bottom electrode being arranged commonly under the raised structures, the projection electrodes formed on the raised structures inducing a horizontal electric field therebetween, the bottom electrode and the projection electrodes formed on the raised structures inducing therebetween a sideway horizontal electric field, wherein the plurality of projection electrodes and the bottom electrode are mounted on the array substrate;

wherein the projection electrodes comprise a primary electrode and a secondary electrode, which are electrically separated from each other and are respectively set at a primary potential and a secondary potential that are different from each other so as to induce the horizontal electric field between the primary electrode and the secondary electrode, the bottom electrode being set at a tertiary potential that is different from the primary and secondary potentials of the primary and secondary electrodes so that the tertiary potential and each of the primary and secondary potentials induce the sideway horizontal electric field between the bottom electrode and each of the primary and secondary electrodes such that the primary and secondary electrodes are separated from each other to provide the horizontal electric field therebetween and the primary and secondary electrodes are separated from the single bottom electrode to each provide the sideway horizontal electric field with the single bottom electrode that is separated from the primary and secondary electrodes;

wherein each of the pixel structures is controlled by two thin-film transistor devices and each of the projection electrodes comprises a first pixel electrode and a second pixel electrode, the first pixel electrode and the second pixel electrode being provided with voltages having a polarity opposite to a voltage polarity of the bottom electrode, the first pixel electrode and the second pixel electrode being respectively formed on different ones of the raised structures to form corresponding projection electrodes, or alternatively, the first pixel electrode and the second pixel electrode being formed on the same one of the raised structures and the first pixel electrode and the second pixel electrode being spaced from each other by a predetermined distance.

2. The pixel structure as claimed in claim 1, wherein the raised structures are each in the form of a circular stand having a trapezoidal cross section, the raised structures having a bottom located on the array substrate, or alternatively, the raised structures are each, in the entirety thereof, in the form of a straight triangular prism having a cross section of an isosceles triangle, a side of the raised structure being located on the array substrate.

3. The pixel structure as claimed in claim 1, wherein the raised structures have a shape in the form of one of a circular stand, a straight triangular prism having a cross section of an isosceles triangle, a semi-ellipse, a semicircle, and a parallelogram.

4. The pixel structure as claimed in claim 1, wherein the raised structures have a height larger than or equal to 1 micrometer and smaller than or equal to 5 micrometers and the raised structures have an inclination angle larger than or equal to 15 degrees and smaller than or equal to 80 degrees.

5. A liquid crystal display device, comprising an array substrate and a color filter, the color filter being arranged at one side of the array substrate and in alignment with the array substrate, wherein the liquid crystal display device further comprises a pixel structure located between the array substrate and the color filter substrate, the pixel structure being formed on the array substrate and controllable by one or two thin-film transistor devices, wherein the pixel structure comprises a plurality of raised structures, a plurality of projection electrodes, and a single bottom electrode, the projection electrodes being formed on the raised structures, the bottom electrode being located commonly under the raised structures, the projection electrodes formed on the raised structures inducing a horizontal electric field therebetween, the bottom electrode and the projection electrodes formed on the raised structures inducing therebetween a sideway horizontal electric field, wherein the plurality of projection electrodes and the bottom electrode are mounted on the array substrate;

wherein the projection electrodes comprise a primary electrode and a secondary electrode, which are electrically separated from each other and are respectively set at a primary potential and a secondary potential that are different from each other so as to induce the horizontal electric field between the primary electrode and the secondary electrode, the bottom electrode being set at a tertiary potential that is different from the primary and secondary potentials of the primary and secondary electrodes so that the tertiary potential and each of the primary and secondary potentials induce the sideway horizontal electric field between the bottom electrode and each of the primary and secondary electrodes such that the primary and secondary electrodes are separated from each other to provide the horizontal electric field therebetween and the primary and secondary electrodes are separated from the single bottom electrode to provide the sideway horizontal electric field with the single bottom electrode that is separated from the primary and secondary electrodes;

wherein each of the pixel structures is controlled by two thin-film transistor devices and each of the projection electrodes comprises a first pixel electrode and a second pixel electrode, the first pixel electrode and the second pixel electrode being provided with voltages having a polarity opposite to a voltage polarity of the bottom electrode, the first pixel electrode and the second pixel electrode being respectively formed on different ones of the raised structures to form corresponding projection electrodes, or alternatively, the first pixel electrode and the second pixel electrode being formed on the same one of the raised structures and the first pixel electrode and the second pixel electrode being spaced from each other by a predetermined distance.

6. The liquid crystal display device as claimed in claim 5, wherein the raised structures are each in the form of a circular stand having a trapezoidal cross section, the raised structures having a bottom located on the array substrate, or alternatively, the raised structures are each, in the entirety thereof, in the form of a straight triangular prism having a cross section of an isosceles triangle, a side of the raised structure being located on the array substrate.

7. The liquid crystal display device as claimed in claim 5, wherein the raised structures have a shape in the form of one of a circular stand, a straight triangular prism having a cross section of an isosceles triangle, a semi-ellipse, a semicircle, and a parallelogram.

8. The liquid crystal display device as claimed in claim 5, wherein the raised structures have a height larger than or equal to 1 micrometer and smaller than or equal to 5 micrometers and the raised structures have an inclination angle larger than or equal to 15 degrees and smaller than or equal to 80 degrees.

\* \* \* \* \*